UNITED STATES PATENT OFFICE.

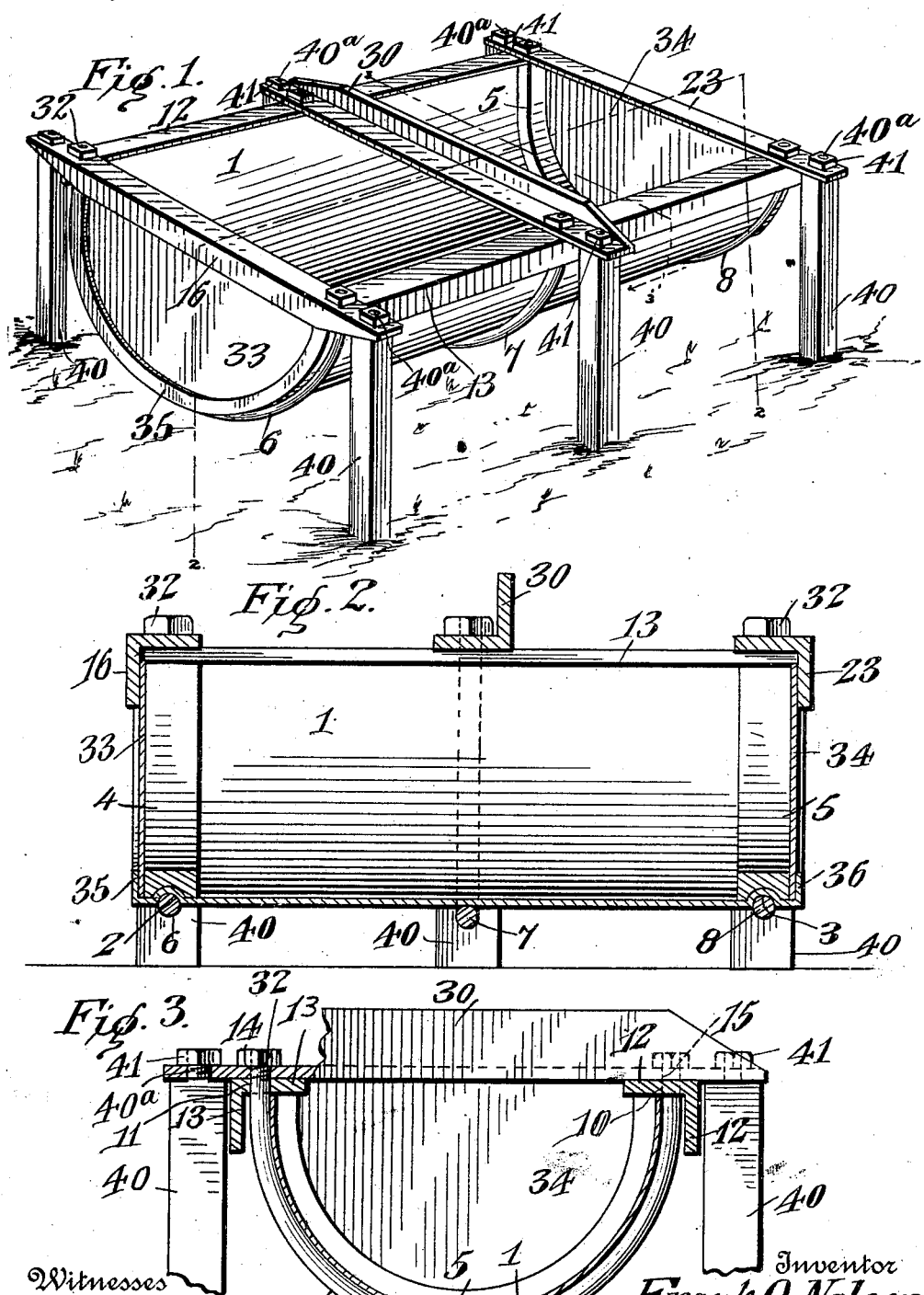

FRANK O. NELSON, OF FAIRFIELD, IOWA.

TROUGH.

No. 922,317.  Specification of Letters Patent.  Patented May 18, 1909.

Application filed June 29, 1908. Serial No. 440,859.

*To all whom it may concern:*

Be it known that I, FRANK O. NELSON, a citizen of the United States of America, residing at Fairfield, in the county of Jefferson and State of Iowa, have invented certain new and useful Improvements in Troughs, of which the following is a specification, reference being had therein to the accompanying drawing.

This invention relates to improvements in troughs or watering tanks and the invention consists in the construction and arrangement of parts, as will be hereinafter described and particularly pointed out in the claims.

Referring to the drawings: Figure 1 is a perspective view of a trough. Fig. 2 is a sectional view taken on line 2—2 of Fig. 1. Fig. 3 is a sectional view taken on line 3—3 of Fig. 2, parts of the drawing being broken away to make its reading clear.

Body portion 1 of the trough is made preferably of sheet metal, preferably bent to the shape shown in the drawings, that is to say, to the shape of a half-cylinder. The body portion 1 is provided with grooves 2, 3, which extend from one side of it to the other. Member 4, bent to correspond to the curvature of body portion 1, rests upon body portion 1 at one end, while member 5, occupies a similar position at the other end of the body portion.

Rods 6, 7, and 8, bent to the same shape as body portion 1, fit around it. Rods 6 and 8 occupy grooves 2 and 3, respectively. The extremities of rod 6 pass through apertures 10 and 11 in side bars 12 and 13, respectively, and then pass through apertures 14 and 15 in end bar 16. The ends of rod 8, in a like manner, pass through apertures in side bars 12 and 13 and through apertures in end bar 23. Rod 7 has its extremities passing through apertures 10 and 11 in side bars 12 and 13 and through apertures 14 and 15 in cross-bar 30. The extremities of rods 6, 7, and 8 are all screw-threaded, and when the parts have been placed in their proper positions, nuts 32 are secured in position on the screw-threaded portions of rods 6, 7, and 8. The result is that the several parts of the trough are firmly held in their assembled positions, and there is no likelihood of their being displaced through the use of the trough.

At either end of the body portion 1 are placed end members 33 and 34. After they have been loosely put in place the ends 35 and 36 of the body portion are bent upward and, if desired, are soldered to the end members. This makes a strong, watertight construction without the use of rivets.

Side-bars 12 and 13 and end-bars 16 and 23 are preferably angle-bars in construction. Each bar is provided with two flanges 24 and 25 which make an angle with each other. The side bars and end bars are placed against the edges of the body portion and the end members, so that the edges of the body portion and the end members rest in the apex of the angle formed by flanges 24 and 25. The result is that the side bars and end bars protect the edge of the trough from all wear and from any of the injuries ordinarily happening during the use of the trough.

The ends of end bars 16 and 23, and of cross bar 30, are provided with apertures through which extend the screw-threaded extremities 40$^a$ of posts 40. Nuts 41 are placed over the screw-threaded extremities of posts 40 and when they have been securely tightened in place, the trough is held firmly upon the posts.

What I claim is—

1. A device of the character described, comprising a semi-cylindrical body portion with an upwardly-disposed flange at opposite ends, the peripheral end-portions of the body having grooves therein, end walls having their outer faces contacting with said flanges, curved reinforcing-members contacting with the inner faces of the curved ends of the body, and also with the inner faces of the end walls, longitudinal side-bars mounted on the upper edges of the tank, transverse cross bars mounted on the ends of the longitudinal bars and having flanges contacting with the flanges on the ends of the body-portion, a transverse middle cross-bar, said end and middle cross-bars having their opposite ends projecting beyond said longitudinal bars, rods engaging said peripheral grooves of the body-portion and having screw-threaded ends projecting through the ends of the longitudinal and transverse bars, means on the ends of said rods to secure the same within said grooves and also to secure the ends of the side and end-bars together, said projecting ends of the transverse bars having supports thereunder provided with screw-bolts which project through the projecting ends of the side-bars, and means on said bolts to hold the trough on said supports.

2. In a device of the character described, the combination of a plurality of pairs of supports or posts, the vertical supports in each pair arranged in alinement, each support provided at its upper end with a reduced threaded extension, bars extending across and covering the upper portions of the vertical supports, said bars constituting caps for the supports, each bar provided with outer apertures near its ends, the threaded extensions of the supports extending through the apertures of the bars, each bar engaging a support of each pair, nuts upon the threaded ends above the bars, each bar provided with a pair of inner apertures between the first-mentioned apertures, a semi-cylindrical body portion in engagement with and extending transversely of the bars, and means surrounding the body portion and extending through the inner apertures of the bars and serving to suspend the body portion upon the bars between the supports.

In testimony whereof I hereunto affix my signature in presence of two witnesses.

FRANK O. NELSON.

Witnesses:
A. L. LONG,
W. J. SCHARFE.